United States Patent [19]

Postupack

[11] 4,138,284

[45] Feb. 6, 1979

[54] METHOD OF FORMING GRADED SHADE BAND ON SUBSTRATE

[75] Inventor: Dennis S. Postupack, Natrona Heights, Pa.

[73] Assignee: PPG Industries, Inc., Pittsburgh, Pa.

[21] Appl. No.: 868,013

[22] Filed: Jan. 9, 1978

Related U.S. Application Data

[63] Continuation-in-part of Ser. No. 694,500, Jun. 10, 1976, abandoned, which is a continuation-in-part of Ser. No. 594,162, Jul. 8, 1975, abandoned.

[51] Int. Cl.[2] ......................... C03C 27/00; B05D 1/04

[52] U.S. Cl. .................................... 156/100; 118/624; 118/627; 156/106; 427/14; 427/27; 427/163; 427/164; 427/165; 427/168; 427/256; 427/282; 427/287

[58] Field of Search ................. 156/99, 100, 106, 240, 156/230, 102, 103, 277, 312, 309, 242, 306; 239/3, 15; 8/4, 3, 18 R, 25 R; 427/32, 33, 269, 256, 287, 163, 165, 168, 14, 27, 29, 30, 31, 280, 282; 118/624, 627, 626, 621, 629, 628, 635

[56] References Cited

U.S. PATENT DOCUMENTS

| | | | |
|---|---|---|---|
| 1,861,475 | 6/1932 | Hopkins et al. | 427/256 |
| 2,082,182 | 6/1937 | Schacht | 118/621 |
| 2,088,542 | 7/1937 | Weston | 118/624 |
| 2,283,253 | 5/1942 | Haven | 118/63 |
| 2,739,080 | 3/1956 | Woodworth | 8/4 |
| 3,004,875 | 10/1961 | Lytle | 427/287 |
| 3,078,693 | 2/1963 | Lytle | 427/163 |
| 3,113,034 | 12/1963 | Fix | 427/256 |
| 3,501,393 | 3/1970 | Wehner et al. | 204/298 |
| 3,591,406 | 7/1971 | Moynihan | 8/4 |
| 3,645,447 | 2/1972 | Cowan | 239/15 |
| 3,904,503 | 9/1975 | Hanfman | 118/624 |

FOREIGN PATENT DOCUMENTS

| | | | |
|---|---|---|---|
| 1243223 | 8/1971 | United Kingdom | 8/2.5 R |

*Primary Examiner*—Michael W. Ball
*Attorney, Agent, or Firm*—Edward I. Mates

[57] ABSTRACT

A method of forming a colored shade band having a relatively wide portion of essentially uniform intensity and a relatively narrow boundary portion of graded intensity by spraying a dye composition along a longitudinally extending edge portion of a non-electroconductive substrate such as a glass sheet or a sheet of plastic. In one embodiment of this invention, the substrate is sprayed to form the graded band and then laminated to a layer of plastic interlayer material to produce a laminated window having a shade band having a desired transverse pattern of graded intensity along a longitudinally extending edge portion thereof. After the dye composition is applied to a sheet of rigid transparent material to form the band, the coated sheet is assembled with the band facing a layer of interlayer material to form a sandwich to be laminated, the band is transferred from the sheet to the layer during lamination and forms a continuous looking band free of any disturbing features such as mottled appearance and having a boundary along a smooth line and a pattern of intensity similar to that of the colored shade band initially developed. In another aspect of this invention, the graded band is applied electrostatically to either the interlayer sheet or to the rigid transparent layer under special conditions that results in a gradation of the coating.

20 Claims, 4 Drawing Figures

FIG. 2
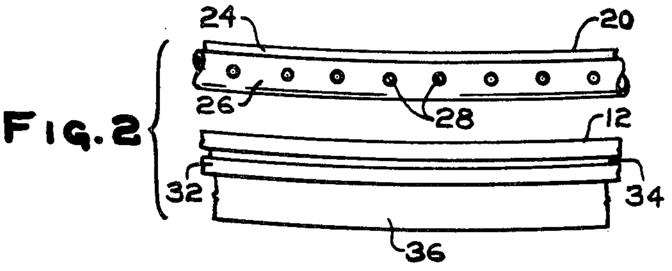
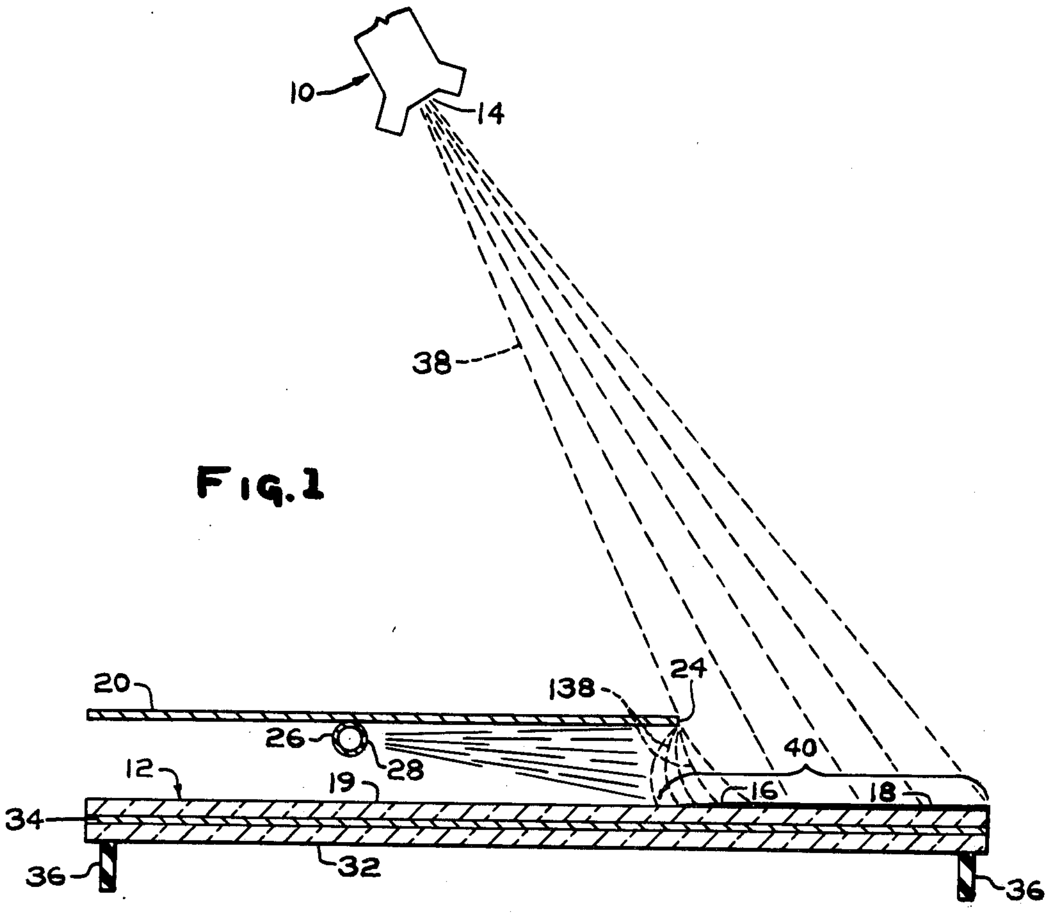
FIG. 1
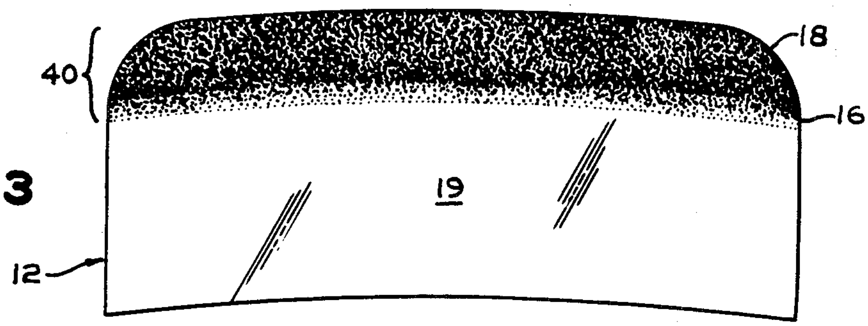
FIG. 3

METHOD OF FORMING GRADED SHADE BAND ON SUBSTRATE

REFERENCE TO RELATED APPLICATIONS

This is a continuation-in-part of application Ser. No. 694,500 of Dennis S. Postupack, filed June 10, 1976, now abandoned for Method and Apparatus of Forming Graded Shade Band on Substrate, which, in turn, is a continuation-in-part of application Ser. No. 594,162 of Dennis S. Postupack, filed July 8, 1975, now abandoned, for Method and Apparatus of Forming Graded Shade Band on Substrate, now abandoned.

BACKGROUND OF THE INVENTION

1. Field of the Invention

The present invention relates to a method of forming a colored band of graded intensity having a desired transverse pattern of graded intensity along a longitudinally extending edge portion of a transparent substrate of glass or plastic. If the substrate is a glass sheet, the colored band of graded intensity is transferred to a plastic sheet used as an interlayer in a laminated glass-plastic safety window during the lamination of said window to form a band having a desired intensity pattern including a smooth boundary between the coated and uncoated portions and free of any disturbing pattern.

Laminated glass has been provided with a band of color along an upper edge when installed in a windshield to protect the occupants of a vehicle from overhead light. It is especially desired that the inner edge of the color band decrease gradually in intensity from an upper portion of essentially uniform maximum intensity toward a lower portion of the windshield having a maximum light transmission for the windshield.

While this invention is especially concerned with the partial coating of glass or plastic sheeting including interlayer material that is a component of laminated glass used in automobiles in such a manner that it is unnecessary to differentially stretch a partly coated plastic interlayer sheet to provide a curved cut-off line for the edge of the colored portion, it is also applicable in the partial coating of substrates used for other purposes, such as other windows in vehicles and in buildings.

The present tendency in automobile design involves increasing the proportional area of glass windows with an object of improving visibility. As the total area of the glass installed in the automobile increases, there is a corresponding increase in the amount of light transmitted to the interior of the automobile. Unfortunately, in sunshine this gives rise to a rapid temperature increase within the vehicle with consequent discomfort to the occupant. The side windows can normally be retracted into the frame of the automobile to provide some relief from the discomfort. However, the windshield and the backlight are usually fixed in position.

It has become common practice to modify the transmission properties of the windshield and backlight so as to reduce the amount of infrared radiation that passes into the vehicle. In case of a laminated windshield, one technique has been to tint the interlayer partially and laminate the partially tinted interlayer with glass sheets. The backlight is usually not laminated but is made of a single sheet of tempered glass. Tinting a backlight has been accomplished by applying a coating to one of the surfaces of the glass. The most suitable coatings have been metal oxide coatings produced by pyrolysis of a metal salt composition that is sprayed onto a heated surface of a glass sheet when the latter is at elevated temperature. The metal salt of the composition applied to the hot glass hydrolyzes into a metal oxide film upon contacting the heated glass. Such coatings have high infrared absorption combined with good transmission properties in the visible portion of the spectrum. Typical metal oxide films are disclosed in U.S. Pat. No. 3,021,227 to Richardson, U.S. Pat. No. 3,244,547 to Orr et al and U.S. Pat. No. 3,078,693 to Lytle. These coatings are also used on glass sheets forming part of a laminated glass-plastic window.

Each of the prior art techniques has some drawbacks. When laminated safety glass windows are fabricated using a tinted plastic as an interlayer, it is necessary to purchase dyed plastic and provide separate storage facilities for dyed plastic and for undyed plastic. Furthermore, the cost of partially dyed plastic obtained from a supplier is very expensive, necessitating a high price for the windshield containing such tinted interlayer sheets as a component thereof. In addition, partially dyed plastic must be stretched differentially to provide a curved boundary between the coated and uncoated portions prior to lamination to curved glass. Controlling the curvature of the boundary represents a further cost of making the ultimate product, particularly when the curve is controlled by stretching.

It is difficult to obtain metal oxide coatings whose optical properties formed by applying a metal salt composition conform to a desired pattern of light transmission because of the difficulty of maintaining uniform consistency of the coating composition, a uniform temperature pattern in the substrate or from substrate to substrate and uniform solubility in the metal salt composition, among other controls that are needed for coatings having suitably controlled optical properties. Generally, metal oxide coatings produced by pyrolysis of metal salt compositions have a mottled effect due to the difficulty in atomizing the spray composition into droplets of uniform composition from droplet to droplet. Also, the thickness required for metal oxide films having the desired reduced transmission characteristics is in the range where iridescent patterns are readily observable. Prior to the present invention, it has been virtually impossible to produce coatings having a main portion of uniform maximum intensity and a portion of controlled width of graded intensity by the aforesaid method.

Films having low coefficients of light transmission have been produced on transparent substrates such as glass by cathode sputtering. U.S. Pat. Nos. 3,506,556 and 3,655,545 to Gillery and Pressau disclose a typical method of forming such films. Unfortunately, cathode sputtered films are expensive to produce and the need exists for a more economical process.

The concept of applying paints and other tinting compositions by an electrostatic spray system has been developed. U.S. Pat. No. 3,645,477 to Cowen discloses an air atomized electrostatic spray device in which air is supplied to the device for the purpose of atomizing a liquid to be sprayed. The air is also employed for operating a self-contained electrogasdynamic power generator for charging the atomized coating material and for maintaining an electrostatic depositing field having one terminus adjacent the locus of atomization. A highly charged atomized mist is imparted to a substrate to be coated. Electrostatic spraying develops a coating of a given intensity characterized by a low transmission coefficient more rapidly than older spraying methods.

The mist so produced comprises highly charged particles that mutually repel one another during the electrostatic spray process. This mutual repulsion causes the particles to spread over a wide area en route to a substrate to be coated. Hence, the electrostatic spray process is suitable for coating an entire substrate uniformly. When an electrostatic spray is applied to an exposed portion only of a substrate, the mutual repulsion of the spray particles causes the electrostatic spray particles to deposit on a large area outside of the exposed portion to which the electrostatic spray is applied and form a pattern of gradually reducing intensity within said large area outside of said exposed portion. Even the interposition of a mask or shield, which controls the boundary in operations in which hydrolyzable salt compositions and sprays other than electrostatic sprays are applied to form coatings in the form of a band, fails to avoid extensive areas of fade-out in coatings applied by electrostatic spraying.

Since the details of the electrostatic spray device does not form part of the present invention and such devices are readily available commerically, the details of the spray gun or power generator for use with the spray gun will not be described in detail in this specification. However, details of a suitable electrostatic spray device may be found in U.S. Pat. No. 3,645,447 to Cowen and details of a suitable electrogasdynamic generator for such a suitable electrostatic spray device are recited in U.S. Pat. No. 3,651,354 to Cowen. The disclosures of these patents relative to an electrostatic spray device and an electrogasdynamic generator for such a device are incorporated herein by reference in order to avoid an excessively long specification.

While electrostatic spray apparatus is theoretically capable of providing proportional variation in the magnitude of the average depositing field strength of the electrostatic field engendered by the magnitude of the delivery rate of atomizing air for effecting proportional variation in the magnitude of the field strength to provide non-uniform deposition of coating, such critical control of non-uniform spray applications is difficult to attain over large areas of the size of the banded portion of graded windshields and backlights for automobiles. Prior to the present invention, a need existed to take advantage of the higher speed of electrostatic coating to produce a colored band having a desired pattern of intensity free of disturbing optical patterns on a substrate to be laminated into a transparent laminated window having a colored band with a desired pattern of intensity.

2. Description of the Prior Art

U.S. Pat. No. 3,004,875 to Lytle discloses applying a band of metal salt composition at an oblique angle toward an edge portion of a substrate to be coated, using a shield to limit the area of application of the coating composition. The resulting band is of gradually increasing intensity from its boundary with the uncoated portion and the edge of the substrate containing the band. Furthermore, the resulting band has a mottled appearance, particularly in its boundary portion adjacent to the edge of the shield because of eddies that evolve beneath the shield near the edge of the shield during the coating operation.

U.S. Pat. No. 3,113,034 to Fix discloses applying a band of coloring material having a repetitive pattern of curved cut-off line to a continuous sheet of plastic interlayer material using a roller coater to which dye is imparted for imparting said dye to a surface of the sheet while the roller coater simultaneously rotates and reciprocates axially against said sheet while the latter moves past a roll coating station. While this principle of transferring dye has been established, the process has not completely eliminated some residual blur in the applied dye pattern so that the cut-off line between dyed and undyed portions appears fuzzy.

U.S. Pat. No. 3,078,693 to Lytle discloses applying a metal salt composition to a portion of a hot glass sheet to form a metal oxide coating and then laminating the coated glass sheet to one side of a plastic interlayer. The metal oxide films have a mottled appearance which is not removed by lamination.

U.S. Pat. No. 2,088,542 to Westin impinges one or more currents of gas onto an atomized spray of coating composition at a point closer to the substrate to be coated then to the point of origin of the jet to delimit the coated area from the uncoated area. A sharp line of demarcation results between the coated area and the uncoated area.

U.S. Pat. No. 2,082,182 to Schacht uses a shield to confine the flow of pulverulent particles toward a substrate and forms a sharp line of demarcation between the coated and uncoated portions of the substrate.

U.S. Pat. No. 1,861,475 to Hopkins and Odgen uses compressed air to confine the application of a spray of lacquer. The sprayed portion is sharply separated from the unsprayed portion.

U.S. Pat. No. 2,283,253 to Haven controls the width of a line of metal formed by spraying metal particles upon a glass substrate at an oblique angle thereto by providing a guard member positioned between the spray source and the substrate. The spray, on passing the edge of the guard member, causes the formation of eddies that set up back sprays, which form a metal mist upon the glass beyond the area desired to be coated. Gaseous fluid is provided under pressure beneath the guard member to counteract the formation of the eddies and prevent the metal particles from passing beneath the guard member. The resulting boundary between the coated line of metal and the uncoated portion is sharp and abrupt, not gradual as desired for purposes of the present invention.

None of the aforesaid patents relate to applying a colored coating having a main relatively wide portion of essentially uniform intensity and a relatively narrow boundary portion of graded intensity by electrostatic spraying. None of the aforesaid patents was confronted with the problem of having to alter a selected portion of a uniform spray pattern resulting from the mutual repulsion of electrostatically charged particles into a portion of graded intensity. None of the aforesaid patents relate to applying a colored coating of graded intensity to a transparent sheet of relatively rigid material that is one component of a transparent laminated window, assembling the sheet and a clear layer of interlayer material and transferring the coating to the layer of interlayer material while laminating said sheet to said layer at high pressure and temperature conditions regardless of whether the coating is initially supplied in an electrostatic field or otherwise.

SUMMARY OF THE INVENTION

According to the present invention, a colored band having a desired transverse intensity pattern, a specific example thereof having a main portion of essentially uniform intensity and a relatively narrow boundary portion of graded intensity, is formed along an outer longitudinal edge portion of a non-electroconductive substrate. The substrate so treated is then in condition to be laminated to a layer of another material to form a laminated window.

The colored band may be applied initially to either a rigid layer, such as glass or a hard transparent plastic that serves as a substitute for glass, such as acrylic resins and polycarbonate resins, or may be applied directly to the interlayer material using the preferred method of electrostatic spraying that represents the preferred embodiment of this invention. This preferred method embodiment is accomplished by applying an atomized spray of a colored coating composition through an electrostatic spray means disposed above the substrate. The spray means is oriented to apply the atomized spray in an oblique direction toward the upper surface of the substrate. A shield is interposed between the electrostatic spray means and the upper surface of the substrate to be coated so as to help control the width of the boundary portion of graded intensity and to shield a portion of the substrate that is desired to be free of coating material. However, because the nature of the electrostatic spray normally causes the spray particles to repel one another, thereby forcing a portion of the spray directed toward the unshielded area to migrate toward the area below the shield, the shield is grounded to modify the electric field in the vicinity of the substrate and to attract the charged particles away from the portion of the substrate facing the shield that is desired to be uncoated.

Furthermore, the present invention also incorporates a manifold of non-electroconductive material located between the shield and the substrate and oriented to apply a non-reactive fluid, such as air, from the manifold to beyond the edge of the shield in a direction having a component toward the outer edge portion of the substrate to help control the smoothness of the boundary of the band and the texture of the graded portion of the band. The fluid is applied from the manifold at a rate sufficient to apply a substantially uniform component of force to the atomized spray of colored material in an amount sufficient to compensate for a major portion of the tendency of the spray particles to deposit on the portion of the substrate facing the shield. The component of force from the blasts emanating from said manifold prevents said atomized spray from making contact with more than a narrow portion of the substrate that is beneath the shield during the electrostatic spraying.

Under these circumstances, a narrow boundary portion of graded intensity of said band forms in alignment with the edge portion of the shield on said substrate, while the main portion of said band on the portion of the substrate beyond the edge of the shield remains essentially of uniform intensity. The simultaneous application of the atomized spray from the electrostatic spray means and the non-reactive fluid from the manifold is discontinued when the band develops sufficient intensity (that is, a sufficiently low transmission coefficient of visible light in the portion of maximum intensity) to satisfy the requirements of the customer.

The electrostatic spray contains a volatile liquid vehicle whose boiling point is sufficiently low (preferably within the range of 35° C. to 120° C.) to enable the vehicle to evaporate during spraying of the substrate. Furthermore, the temperature of the atmosphere at which coating takes place is preferably elevated sufficiently to enhance evaporation of the solvent in transit to the substrate surface. When glass is sprayed, the substrate is maintained within a temperature range of at least the boiling point of the volatile liquid vehicle during the application of the electrostatic spray to encourage evaporation of the volatile vehicle during spraying. At this temperature range, each particle of the finely divided mist that strikes the substrate remains in the form of a small discrete particle. Sprays applied to cooler glass substrates tend to agglomerate and form puddles that remain observable in the graded band of the final laminated window as mottled areas.

The application of the composition to be sprayed by electrostatic spraying insures a finer mist for the spray composition than other known spraying techniques. Applying the electrostatic spray to a heated substrate insures that the fine mist of the spray composition deposits as a series of fine particles onto the heated substrate, rather than coalescing to form larger drops that cause a mottled appearance when applied to a relatively cool substrate.

When the substrate is a plastic interlayer composition, such as plasticized polyvinyl butyral or polyurethane, the substrate temperature need not be as elevated as in the case with a glass substrate provided a solvent is selected for the spray composition that can react with the interlayer composition at temperatures below the boiling point of the solvent. However, the temperature of the environment must be such as to permit evaporation of the solvent during and after spraying with a minimum of chemical reaction. Suitable substrate temperatures range from about 70° F. (21° C.) to 125° F. (52° C.) while the environmental temperature preferably ranges from 70° F. (21° C.) to 200° F. (93° C.) when the substrate is a plastic interlayer composition of the class described.

A suitable spray composition for glass substrates comprises a mixture of colored organic dyes dissolved in an organic solvent and optionally containing a limited amount of a binder, such as polyvinyl butyral (preferably, about 0.02 to about 0.4 percent by weight based on the composition). The minimum amount of binder included should be sufficient to insure adhesion of the dye components of the spray composition on the substrate during the interval between spraying the substrate and laminating the coated substrate to form a laminated window. As the amount of binder included in the spray composition increases beyond a desired maximum, the binder causes the band in the resulting laminate to show a cobweb type pattern. Also, too much binder in the spray composition causes the band to develop a pattern of ink corresponding to the embodiment pattern of the interlayer material which does not disappear during final lamination unless the binder content of the spray composition is limited. The spray composition for interlayer materials can omit the binder completely. However, the rate of coating formation is retarded when no binder is included. Hence, a range of 0.02 to 0.2 percent binder is suitable for spray compositions for interlayer materials. Optimum spray compositions preferably contain between 0.02 to 0.1 percent of binder by weight based on the composition to provide optimum adhesion combined with an acceptable amount of texture.

When such a composition is applied to a glass sheet at a glass sheet temperature within the preferred range by electrostatic spraying to form a band of coating and the band-coated glass sheet is assembled with a layer of interlayer material and another glass sheet to form a sandwich that is laminated at a temperature above the boiling point of the volatile liquid vehicle under usual production conditions (about 135° C. and 13.6 atmospheres for 30 to 45 minutes), the band is transferred from the glass surface to the interlayer and through the thickness of the interlayer to form a stable laminated window having a colored band with a desired pattern across its width free of disturbing features such as a mottled appearance.

The resulting laminated windshield with the colored band of graded intensity is thus produced without requiring either a separate inventory of partially dyed plastic interlayer material or a special step of stretching the interlayer material differentially to provide a curved boundary between its coated and its uncoated portions. The texture of the band is superior in optical properties to that resulting from laminating a banded, transparent substrate whose band is formed by coating procedures other than electrostatic coating.

When the band is applied to a layer of interlayer material using the electrostatic spray technique of the present invention to provide a curved cut-off line of desired configuration between the coated and uncoated portions, it is not necessary to stretch the layer of interlayer material differentially to obtain the curved cut-off line desired. Since this aspect of the present invention avoids differential stretching that causes the interlayer to develop a non-uniform thickness, which complicates its uniformity of adhesion to the rigid transparent sheet of the laminate, this aspect of the invention results in a more efficient operation in preparing partially coated interlayers for use in curved laminated windows.

The present invention will be better understood in the light of a description of a preferred embodiment and variations thereof that follows.

BRIEF DESCRIPTION OF THE DRAWINGS

In the drawings that form part of the description of an illustrative embodiment and where like reference numbers refer to like structural elements, FIG. 1 is a fragmentary, schematic view in cross-section showing the relative locations of electrostatic spray means, a grounded electroconductive shield and a fluid distribution manifold with respect to the upper surface of a substrate on which a band of coating is to be deposited, and means to support the substrate;

FIG. 2 is an enlarged fragmentary end view of a portion of the schematic view of FIG. 1, showing how the relation of the curvature of the shield and of the manifold compares with that of a curved glass sheet to which a band of coating is applied according to the present invention;

FIG. 3 is a plan view of a finished article produced according to the method of the present invention.

DESCRIPTION OF THE PREFERRED EMBODIMENTS

Figure 4:
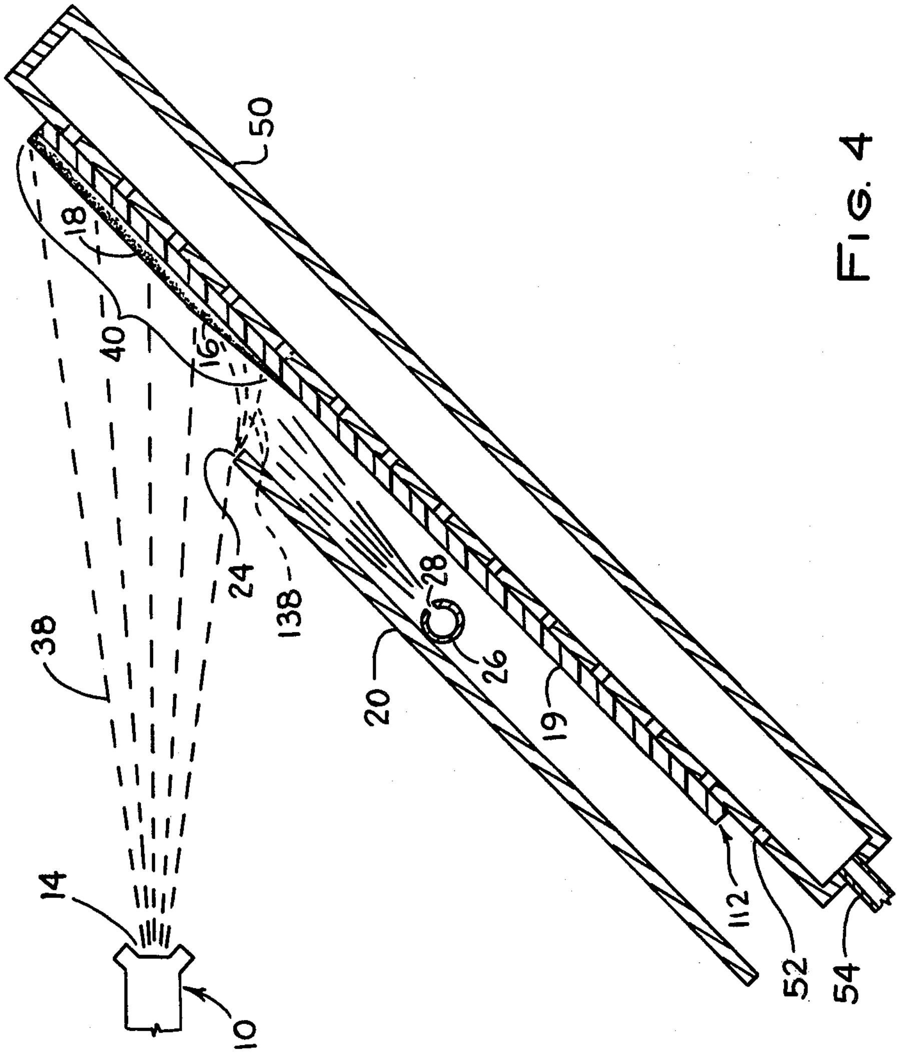
FIG. 4 is a schematic view similar to FIG. 1 of an alternate embodiment for performing the method of the present invention.

Referring to the drawings, FIG. 1 shows a schematic arrangement of an embodiment of coating apparatus which conforms to the present invention. The apparatus comprises electrostatic spray means in the form of a spray gun 10 located within a spray booth (not shown). The electrostatic spray gun 10 is oriented to apply a highly charged spray in an obliquely downward direction toward the upper surface of a substrate (such as glass sheet 12) and is provided with an orifice 14 which serves as the origin of the atomized spray of a filming composition. Apparatus (not shown) which includes a cam and means to impart reciprocating motion to the spray gun 10, such as depicted in U.S. Pat. No. 3,021,227 to Richardson, the disclosure of which is incorporated herein by reference, may be incorporated in the spray station.

A grounded shield 20 of electroconductive material (such as any suitable metal) is located below the path of reciprocating movement traversed by the spray gun 10 and above the position occupied by the glass sheet 12, which serves as the illustrative embodiment of the substrate. An outer edge 24 of the shield 20 is aligned over the glass sheet 12 in approximate alignment with the position desired for a graded boundary portion 16 between the portion 18 to be coated uniformly and the portion 19 to remain uncoated.

In plan, the outer edge 24 may be straight or curved depending on the configuration desired for the boundary between the coated and uncoated portions of the substrate 12.

An apertured pipe manifold 26 of circular cross-section is supported on the lower surface of the shield 20. The manifold 26 is provided with a series of apertures 28 that extend radially through the wall of the pipe manifold 26 in a common plane. Preferably the apertures are spaced at equal distances along the length of the manifold 26, have equal diameters to one another and are directed at the same orientation relative to the manifold anywhere from a slight angle upward to a slight angle below the equatorial plane of the pipe manifold 26. Preferably, the apertures are arranged between an angle 30 degrees to the north of the horizontal equatorial plane and an angle 30 degrees to the south of the equatorial plane extending horizontally across the cross-section of the manifold 26. The manifold is located a sufficient distance behind the edge 24 of the grounded shield 20 so that blasts of fluid imparted through the apertures 28 blend with one another to form a substantially uniform pressure bed in the direction from the manifold 28 to beyond the edge 24 of the grounded shield 20 and toward the outer edge portion of the substrate 12.

The following parameters are suggested to obtain intensity patterns providing the best combination of optical properties by electrostatic spraying. These include uniform intensity along a relatively wide portion along the entire length of the substrate, uniform gradation of intensity along a relatively narrow boundary portion terminating in a smooth boundary between coated and uncoated portions and substantial freedom from any disturbing feature such as a mottled appearance in the band of coating.

The distance from the spray gun orifice to the substrate that is selected for a given operation is based on several parameters. An important parameter is the width of the band to be formed and should be increased as the desired width of band is increased. Preferably, this distance is approximately 1.5 to 4 times the width of the band portion having uniform intensity.

The ratio of atomizing air flow rate to liquid dye composition flow rate through the electrostatic spray gun should be as high as necessary to obtain optimum atomization of the liquid dye composition. This factor is needed to assure a high charge to mass ratio for each particle of the atomized spray of liquid dye composition. For a flow rate of 0.5 to 1.5 cubic centimeters per second of liquid dye composition, a flow rate of the atomizing air of 1600 to 4000 times the liquid dye composition flow rate is recommended for a spray gun orifice to substrate distance of 250 millimeters.

The vertical distance from the substrate to the grounded shield preferably should approximate half the width desired for the boundary portion of graded intensity of the band when the shield is used in conjunction with a manifold. Without a manifold, it is difficult to obtain a boundary portion of the band that has both desired graded intensity and is free of texture. The presence of texture is believed due to eddies of dye composition that form agglomerates of dye composition beneath the shield and are deposited upon the substrate beneath the shield, particularly when the dye composition spray is electrostatically charged.

The manifold is preferably an elongated apertured pipe of a non-electroconductive material that is highly flexible and that is easily drilled, such as polyethylene or polypropylene. While it may appear desirable to use a slotted orifice for the manifold, experience has taught that uniformly spaced apertures of uniform diameter provide a preferred means of supplying pressurized air to control the boundary of the band and the pattern of intensity of the boundary portion of graded intensity of the band. It is difficult to obtain an elongated slot of uniform width over a length range of 1 to 2 meters - the order of magnitude of windshield lengths that must be provided with a band. Hence, a series of apertures is preferred over a continuous slot for the manifold.

The inner cross-section of the manifold and the diameter of and spacing between its apertures are so chosen as to provide a uniform rate of air flow through each aperture. Adequate uniformity of air flow has been obtained using a pipe manifold whose interior cross-sectional area is approximately three times the total cross-sectional area of the apertures of the manifold. Since individual apertures are used rather than elongated slots for applying air blasts from the manifold toward the marginal portion of the area of the substrate to be coated, the manifold must be located a minimum distance from the edge of the shield sufficient to enable the individual air blasts to merge before they contact the spray of liquid dye composition applied to the substrate. If the manifold is so close to the edge of the shield that the blasts from the manifold are discrete in the vicinity of the edge of the shield, the boundary of the portion of the band having graded intensity tends to have a saw-tooth pattern. However, the manifold must be sufficiently close to the edge of the shield supporting the manifold that the air blasts provide sufficient pressure to divert the charged particle of the liquid dye composition mist from the portion of the substrate that is desired to be maintained uncoated and to have a varying effect on the portion of the substrate immediately inward and immediately outward of the line directly below the edge of the shield. For an air flow of 0.0012 standard cubic meters per second flowing through a manifold 45 inches (114.3 centimeters) long having an inner diameter of 0.5 inch (1.27 centimeter) and 88 equally spaced, axially aligned apertures spaced 0.5 inch (1.27 centimeter) center to center, each having a diameter of 1/16 inch (1.59 millimeter), a suitably uniform boundary is obtained between the coated and uncoated portions when the manifold is located between 4 inches (10 centimeters) and 7.5 (19 centimeters) from the edge of the shield. Smaller diameter apertures are impractical to drill because the number of apertures needed per unit length of manifold varies inversely with the square of the diameter of the individual apertures. Larger diameter apertures must be spaced farther apart than those used and are more difficult to obtain blending unless the manifold is located a larger distance from the edge of the shield than is the case with the manifold used, thereby requiring a greater rate of air flow than that required for the manifold described.

Larger diameter apertures may be used with larger diameter pipe manifolds, provided the manifold to shield edge distance is adjusted to be sufficient to avoid a saw-tooth pattern along the boundary of the band between the coated portion and the uncoated portion of the substrate. Also, using larger diameter pipe manifolds limits the minimum distance that the shield may be located above the substrate, thus limiting the minimum width of the portion of graded intensity that may be obtained by this technique.

In operation of the embodiment of FIGS. 1 and 2, a glass sheet 12 is mounted on another glass sheet 32 having a shape and contoured outline that conforms to that of the glass sheet 12 with a layer 34 of dark, flexible, heat absorbing material, such as felt, between the sheets to form an assembly that is mounted on an outline support 36. The latter has an upper surface whose contour and outline conform to those of the supported assembly. Preferably, the support 36 is of non-conductive material such as wood or a fiber-glass reinforced resin and the like.

When a substrate 112 is a sheet of flexible interlayer material, such as polyurethane or plasticized polyvinyl butyral, the substrate is laid directly on a foraminous vacuum platen 50 (FIG. 4) having a flat upper surface provided with apertures 52 and an exhaust pipe 54 leading to a vacuum source (not shown) and vacuum is applied to hold the substrate in fixed position on the platen. The manifold 26 and the shield 20 are also flat and curved in plan only to conform to the shape desired at the inner end of the graded coating. The method depicted in FIG. 4 shows the substrate supported in an oblique plane and the electrostatic spray applied in a generally horizontal direction from one or more spray guns 10 that reciprocate while providing a spray that forms a shade band having a graded boundary portion 16 between the uniformly coated portion 18 and the uncoated portion 19. In the FIG. 4 embodiment, the flexible substrate is supported in an oblique plane, preferably one that makes an angle of 30 to 60 degrees with the horizontal, and the spray is preferably applied along an approximately horizontal direction.

The coating apparatus is usually enclosed and provided with a conventional exhaust hood (not shown) to remove any portion of the spray that does not adhere to the substrate and heat lamps to irradiate the substrate 12 to a desired temperature related to the boiling point of the volatile liquid component of the spray composition. For spraying glass substrates, this boiling point is in the range of 35° C. to 120° C. and the substrate temperature at least equal to the boiling point during electrostatic spraying. The dark felt layer 34 helps promote a more uniform temperature throughout the extent of the substrate 12 in order to improve the uniformity of the transverse arrangement of the band of coating along the length of the outer edge portion of the substrate 12.

An atomized spray depicted by the dotted lines 38 is directed toward an edge portion 40 of the glass sheet 12 from the orifice 14 of the electrostatic spray gun 10. The nature of the electrostatic spray 38 is such that the atomized, highly charged particles tend to repel one another and migrate beneath the shield 20 as shown by dotted lines 138. However, the force of air blasts from apertures 28 provides a horizontal component of a pressure blanket that forces the atomized particles outward again toward the edge portion 40. There, they are deposited to form a narrow graded portion 18 approximately directly below the outer edge 24 of the grounded shield 20.

It is noted that the boundary between the outer edge portion 40 that is coated and the remainder of the glass sheet substrate 12 that is uncoated is curved. This curvature is preferably obtained by curving the edge 24 of the shield 20 in plan and curving the length dimension of the pipe manifold 26 in plan along parallel curved paths. If desired, the cam that guides the reciprocating movement of the electrostatic spray gun 10 may also be curved in plan along a path parallel to the curvature of edge 24 and that of the pipe manifold 26.

When the substrate to be coated is curved, it is supported in a similar manner on a curved sheet 32 supported on an outline support 36 on conforming curvature. The shield 20, the manifold 28, and, if desired, the cam (not shown) may be curved in elevation to conform to the curve of the substrate 12 as is indicated in FIG. 2.

While the boundary between the band of coating and the uncoated portion appears curved, when the coated substrate is installed in a vehicle, the boundary appears to lie in a horizontal plane.

The electrostatic spray gun 10 is reciprocated while an atomized spray is applied through the orifice 14 at an obliquely downward direction over the edge 24 of the grounded shield 20 toward the exposed outer edge portion 40 of the supported glass sheet 12. At the same time, air under pressure is applied through the apertures 28 of the manifold 26 beyond the edge 24 toward the outer edge portion 40 of the glass sheet 12 in a direction having a large component of motion parallel to the upper surface of the glass sheet 12 so as to provide means for the air blasts through the apertures 28 to mingle with the atomized spray from the spray gun 10 and to apply a component of force through the atomized spray in an amount sufficient to prevent the atomized spray from moving a substantial distance inwardly from the edge 24 beneath the shield 20 during the electrostatic spraying. This spraying and applying the air blasts continues simultaneously until the band develops a sufficient intensity to satisfy requirements of the customer.

A typical coating composition used to provide a band of color on a glass substrate contains 20 cubic centimeters of a dye composition, 80 cubic centimeters of a non-poisonous organic solvent, such as acetone, and 6 to 14 cubic centimeters of a solution containing two percent by weight of polyvinyl butyral dissolved in ethanol. A minor amount of ultraviolet absorber and color stabilizer such as a substituted benzotriazole (sold under the trademark TINUVIN P®) may be added. The dye composition in said typical coating composition contains three components: PLASTO red B dye, PLASTO yellow MGS dye, and PLASTO blue RDA dye. The PLASTO dyes are sold by Allied Chemical and include filler material as sold.

Inert filler contained in each dye is removed by dissolving each of the dye components separately in cellosolve (ethylene glycol monoethyl ether) and mixing vigorously for eight hours. After eight hours of vigorous mixing, each dye component is permitted to stand for 64 hours during which time the inert fillers separate by sedimentation. Each dye component solution is decanted and filtered to minimize the amount of inert filler material suspended in the dye solution. The three filtered dye components so treated to remove their inert filler material (mostly graphite and impurities) are mixed in the proportion of 49 percent red, 38 percent yellow and 13 percent blue by volume to obtain a dye solution that yields a band having a desired color when the composition is applied.

The dye composition formed by the aforesaid mixture is then diluted with a liquid vehicle such as acetone in a ratio of 1 part of mixed dye solution to 4 parts by volume of acetone to develop a solution having the required "dry" spray characteristics. Since acetone has a boiling point of 56.5° C., a preferred substrate temperature during electrostatic spraying is one that is slightly higher than the boiling point of the liquid vehicle or 60° C. to 65° C. The substrate must be kept below a temperature at which the dyes decompose. Usually the dyes used decompose at temperatures above those used during laminating so that there is considerable leeway in the upper temperature permitted for the substrate during electrostatic spraying.

In one system of spray composition, 12 cubic centimeters of a binder composition containing 2 percent by weight of polyvinyl butyral plasticized with 41 parts of triethylene glycol di(2-ethyl butyrate) by weight per 100 parts of polyvinyl butyral dissolved in ethanol is added to each hundred parts by volume of the solution of filtered dyes in acetone. In a second system, 20 parts by volume of the mixture of filtered dyes is dissolved in 60 parts by volume of acetone and 20 parts by volume of ethanol and 6 to 14 parts per hundred parts of the aforesaid solution containing 2 percent polyvinyl butyral dissolved in ethanol is added. Since ethanol has a boiling point of 78.4° C., the substrate temperature during electrostatic spraying is controlled to be slightly higher than the boiling point of the mixture that forms the liquid vehicle for the spray composition using the second system.

The dye composition may contain approximately 0.4 grams of a substituted benzotriazole (TINUVIN P®) per 100 cubic centimeters of dye composition as a color stabilizer and ultraviolet absorber.

The dye solution used in commercial printing of a tinted band on polyvinyl butyral contains several percent by weight of polyvinyl butyral to increase its viscosity sufficiently to insure that the solution remains printed in the pattern applied. The dye system used in the present process involving electrostatic spraying optionally contains a very small amount of polyvinyl butyral binder, limited to a maximum of approximately 0.4 percent by weight. The amount of polyvinyl butyral binder in the dye composition is sufficiently small to permit interdiffusion of the dyed material during the laminating cycle that follows the application of the band. Thus, the individual finely atomized droplets of dye which are deposited on the glass surface diffuse into the polyvinyl butyral or other plastic interlayer during lamination to form a graded, diffuse, continuous looking dyed band.

When the polyvinyl butyral content of the dye solution exceeds approximately 0.4 percent, the band of coating tends to develop a cobweb type pattern which appears as dust particles in the laminated product. Furthermore, an increased amount of polyvinyl butyral concentration inhibits the migration of the dye both laterally and through the thickness of the interlayer during the lamination cycle. When a dye solution containing a polyvinyl butyral content not exceeding 0.4 percent by weight is used in the electrostatic spray process described, the individual, finely atomized droplets of dye coalesce to form a graded, diffused continuous band during lamination.

Other electrostatic spray solutions are suitable for use without a binder. These comprise perferably about 1 to 2 weight percent of dye components in a solvent system consisting essentially of a combination of tetrahydrofuran and N-lower alkyl pyrrolidone, and preferably containing about 75 to 85 percent by volume tetrahydrofuran and about 15 to 25 percent by volume N-methylpyrrolidone. This solvent system satisfies the requirements of high dye solubility, preferably greater than 2 percent, and proper volatility to assure optical uniformity in the shade band. Nonuniformity in the shade band is caused by both too low volatility, which results in a mottled texture, and too high volatility, which results in undissolved dye particles being physically bound to the surface of the substrate. This solvent system is also an acceptable solvent for the anti-oxidants and ultraviolet light stabilizers which are preferably added to the dye components.

Suitable dye solutions comprise a mixture of organic dye components, blended to yield a desirable color. A preferred dye mixture is a blend of blue, yellow and red-violet dye components. A preferred blue dye component comprises an anthraquinone derivative such as 1,4-diethylamino-anthraquinone. A preferred yellow dye component comprises a monoazo compound with a molecular formula of $C_{17}H_{16}O_2N_4$. A preferred red-violet dye component appears by infrared analysis to be an anthraquinone derivative comprising an amine functionality; however, positive identification was not obtainable. An appropriate blend of the preferred dye components, antioxidants and ultraviolet light stabilizers yields a relatively color fast blue-green colored shade band.

The relative distances from the spray gun orifice 14 and from the apertures 28 of the manifold to the outer edge portion 40 of the glass sheet substrate 12 is correlated with the potential field, the rate of spray applied and the distance of the shield 20 from the substrate in order to assure a uniform intensity pattern from the boundary of the band to the edge of the glass along the entire length of the glass.

After a substrate is coated, it is laminated to another substrate of rigid transparent material that is uncoated using a layer of interlayer material. The latter may be plasticized polyvinyl butyral or polyurethane or any other well known interlayer material. Also, the coated substrate may be laminated to a layer of interlayer material to form a so-called bilayer windshield of the type disclosed in U.S. Pat. No. 3,808,077 to Raymond G. Rieser and Joseph Chabal.

EXAMPLE I

In a typical operation to form a band about 4½ inches wide (114.3 millimeters) having an inner end approximately 1.5 inches (38.1 millimeters) wide of decreasing intensity at the portion away from the outer edge of a glass sheet supported horizontally, a Model 551-000 hand spray gun supplied by ElectroGasDynamics, Inc. was used and oriented to apply an electrostatic spray composition produced by dissolving each dye component in cellosolve and further diluting said dye component solutions in acetone obliquely downward at a 45 degree angle to the upper glass sheet surface, a grounded shield was disposed in a horizontal plane 28.6 millimeters above the glass surface with a manifold of polyethylene tubing having a 12.7 millimeter inner diameter attached directly to the lower surface of the shield at a distance of 161.9 millimeters from the edge of the shield. The manifold was provided with apertures 1/16 inch (1.6 millimeters) in diameter separated every ½ inch (12.7 millimeters) center to center and directed at an angle of about 20 degrees downward from the horizontal. Air was supplied to the manifold at 2.5 standard cubic feet per minute (0.0012 standard cubic meters per second) for release through 88 equally spaced apertures.

The spray gun was moved back and forth relative to the length of the substrate at a speed of about one foot (300 millimeters) per second. The spray composition was applied at a rate of 26 to 60 cubic centimeters per minute at the orifice of the spray gun and a potential of 50,000 to 85,000 volts was applied to the electrostatic spray head of the gun. Air was supplied to the spray gun at a rate of 4 standard cubic feet per minute (approximately 0.002 standard cubic meters per second). The substrate temperature was 150° F. (65° C.) during spraying.

Under the circumstances described above, the narrow graded portion 16 between the portion of uniform intensity 18 and clear portion 19 of the coated substrate formed under the edge of the shield and extended a short distance in both directions from said edge.

A pair of glass sheets shaped to the outline of a Volkswagen windshield was bent to conforming shape. One of the pair of shaped glass sheets was coated by electrostatically spraying the PLASTO dye composition (containing the second system including 14 parts of the binder composition per 100 parts of dye solution) onto the glass sheet at a glass temperature of 65° C., the other glass sheet was left uncoated and the two sheets assembled on opposite sides of a sheet of polyvinyl butyral plasticized with triethylene glycol di-2 ethyl butyrate to form a sandwich which was laminated by exposure to 200 psi (13.6 atmospheres) and 275° F. (135° C.) for 30 minutes. The resulting windshield had optical properties superior to those obtained from laminating a glass sheet having a band of metal oxide coating formed by pyrolysis to an uncoated glass sheet using a polyvinyl butyral interlayer. Whereas the laminates containing pyrolyzed metal oxide coatings had a mottled texture, the Volkswagen windshield containing the band of coating produced by electrostatic spraying was free of said mottled appearance.

EXAMPLE II

The same parameters as in Example I are used to coat a band along an edge portion of each of several flat glass sheets approximately 30 centimeters square. In each experiment, a different parameter is varied with the following results:

Experiment 1 — Identical parameters as in Example I produce a band having a uniform intensity portion about 11 centimeters wide and a portion of graded intensity about 4 centimeters wide with a uniform, straight, fade-out boundary and no mottled texture.

Experiment 2 — Identical parameters as in Experiment 1 except for not applying air through the manifold produce a band having a uniform intensity portion about 11 centimeters wide and a portion of graded intensity about 8 centimeters wide with a mottled texture noticed in the region of graded intensity.

Experiment 3 — Identical parameters as in Experiment 1, except that the manifold is located about 5 centimeters from the edge of the grounded shield, produce a band having a portion of uniform intensity about 11 centimeters wide and a portion of non-uniform intensity about 2 to 3 centimeters wide with a serrated appearance along the boundary of the band. No texture is noted in the sheets so coated.

Experiment 4 — Identical parameters as in Experiment 1, except that the shield is not grounded and no air is supplied to the manifold, produce a band having a portion of uniform intensity about 11 centimeters wide and a portion of graded intensity about 10 centimeters wide with worse texture noted than in Experiment 2 of this Example.

Experiment 5 — Identical parameters as in Experiment 2, except that the manifold is removed and the shield is supported at various distances above the substrate. The graded intensity portion of the band has a mottled appearance in all instances where the shield to substrate distance is at least 2 centimeters. A sharp line of demarcation between coated and uncoated portions results when the shield to substrate distance is less than about 1 centimeter.

Experiment 6 — Identical parameters as in Experiment 1, except that the spray gun is used without electric power applied, provide bands having a uniform intensity portion about 11 centimeters wide and portion of graded intensity about 3 centimeters wide with no mottled texture. However, it was necessary to continue spraying for 1 minute to obtain a 6 percent luminous transmittance in the uniform intensity portion compared to only 15 seconds of electrostatic spraying for Experiment 1 and the resulting coatings of Experiment 6 have a slightly coarser appearance than those of Experiment 1.

Experiment 7 — Identical parameters as in Experiment 1, except that the substrate temperature during spraying is room temperature (approximately 20° C.) produces a band having a portion of uniform intensity 11 centimeters wide and a portion of graded intensity 4 centimeters wide. However, the entire band has poor optical properties characterized by a very mottled or puddled appearance.

Experiment 8 — The parameters as in Experiment 1, except for varying the concentration of polyvinyl butyral binder in the spray composition produces a cobweb effect when the concentration of polyvinyl butyral exceeds 0.4 percent by weight of the spray composition. These cobwebs are 1.5 centimeters long when the spray composition contains 17 percent by weight of polyvinyl butyral binder. Spray compositions having no polyvinyl butyral binder produce coatings that have a mottled texture and that lack durability as they are readily wiped off the substrate during handling, comprising assembling and laminating.

In all the experiments, observations of the mottled appearance become evident after the coated substrate was laminated to an uncoated glass sheet even though such optical defects were not necessarily obvious before lamination.

The experiments reported in Example II indicate the superiority of electrostatic spraying to ordinary spraying, the desirability of providing a combination of a grounded shield of electroconductive material with an apertured manifold of non-electroconductive material, the desirability of positioning the manifold in a proper location relative to the edge of the shield, the spray gun and the substrate, the desirability of controlling the substrate temperature during spraying and the desirability of incorporating a limited proportion of polyvinyl butyral binder in the spray composition.

EXAMPLE III

The same parameters are employed as are used in Example II, except that the manifold is located 6 inches behind the edge of the shield, the apertures are oriented to direct the air horizontally and a dye composition consisting essentially of 45 parts by weight of a mixture of CALCO dyes sold by American Cyanamid Corporation containing 10 parts by weight of 0.5 percent by weight of CALCO Violet ZIRS dye in cyclohexanone, 5 parts by weight of 0.5 percent by weight of CALCO Yellow G concentrate dye in cyclohexanone and 3 parts by weight of 0.5 percent by weight of CALCO Oil Blue N dye in cyclohexanone, which mixture is mixed with 45 parts of acetone by weight and 10 parts by weight of a binder containing 0.2 percent by weight of polyvinyl butyral in cyclohexanone, is applied along the edges of flat and curved glass sheets, which are subsequently laminated to a layer of clear plasticized polyvinyl butyral and clear glass sheets of matching curvature as described in Example I. Transparent laminates result having optical properties and mottle characteristics comparable to those obtained from corresponding laminates as produced in Example I.

EXAMPLE IV

The same technique as recited in Example III is used to apply graded bands of coating along one longitudinal side edge of layers of horizontally supported flat plasticized polyvinyl butyral (30 centimeters square) that are electrostatically coated using a shield having a curved edge and a dye composition similar to that of Example III and one omitting the binder from the composition of Example III and the interlayer sheets and successfully coated at temperatures ranging from 68° F. (20° C.) to about 100° F. (38° C.). When the coated interlayer sheets are laminated between matching clear glass sheets, transparent laminates having adequate optical properties result. The laminating process is at 200 pounds per square inch pressure (13.6 atmospheres) and 275° F. (135° C.) to 300° F. (149° C.) for 30 minutes as in all the laminating processes reported herein.

EXAMPLE V

The same techniques as recited in Example IV are used to apply a graded band of coating along one longitudinal side edge of several layers of horizontally supported flat polyurethane. Suitable results are obtained after lamination at 275° F. (135° C.) to 300° F. (149° C.).

EXAMPLE VI

A dye composition is prepared comprising 38.5 percent by weight Solvaperm Red-Violet R, available from American Hoescht Corporation, 38.5 percent Calco Oil Blue N and 23.0 percent Calco Oil Yellow G Concentrate, both Calco dyes sold by American Cyanamid Company. A solution is prepared comprising 1.5 grams of the above dye composition per 100 milliliters of solvent. The solvent consists of 85 percent by volume tetrahydrofuran and 15 percent N-methyl-pyrrolidone. The above solution is electrostatically sprayed on an edge portion of a sheet of polyvinyl butyral while the latter is in a temperature range of 35° C. to 45° C. to yield an optically uniform blue-green shade band. When the above solution is sprayed using the arrangement of FIG. 4 by reciprocating an electrostatic spray gun longitudinally of the area to be sprayed, the resulting shade band has the desired pattern density transverse to the axis of reciprocation and a substantially uniform density parallel to the direction of reciprocation.

EXAMPLE VII

A dye composition is prepared as in Example VI. A solution is made comprising 1.2 grams of the dye composition per 100 milliliters of a solvent system consisting of 80 percent by volume tetrahydrofuran and 20 percent by volume N-methyl-pyrrolidone. The solution further comprises, per 100 milliliters of solvent, 0.12 grams of an antioxidant, Irganox 1035, and 2.4 grams of an ultraviolet light stabilizer, Tinuvin 770, both available from Ciba-Geigy Corporation. The above solution is electrostatically sprayed as in Example VI to yield shade bands having characteristics of optical uniformity parallel to the direction of spray gun reciprocation and of the desired pattern of intensity normal to said direction.

The form of the invention shown and described in this specification represents illustrative preferred embodiments and certain modifications thereof. It is understood that various changes may be made without departing from the gist of the invention as defined in the claimed subject matter that follows.

I claim:

1. A method of forming a band of colored material along an outer edge portion of a surface of a non-conductive substrate, said band having a maximum intensity along its outer edge and a decreasing intensity adjacent the inner edge of said band comprising, supporting a grounded shield of electroconductive material adjacent said substrate with an edge of said shield approximately aligned with said inner edge of said portion of said substrate to which said band is to be applied, applying by electrostatic spraying in an oblique direction toward said outer edge portion of a surface of said substrate, from electrostatic spray means spaced from said shield, an atomized electroconductive spray of colored coating composition containing a mixture of dyes as essential ingredients and capable of forming said band on said substrate, and simultaneously applying a non-reactive fluid between said grounded shield and said substrate surface toward said outer edge portion of said substrate surface at a rate sufficient to apply a component of force to said atomized spray in a direction parallel to said surface sufficient to control the formation of a smooth boundary portion of graded intensity in a band of colored coating composition that results from the electrostatic spraying of said atomized spray, and discontinuing said simultaneous application of said atomized spray from said electrostatic spray means and said non-reactive fluid when said band develops a desired degree of color intensity.

2. The method as in claim 1, wherein said substrate is a sheet of glass.

3. The method as in claim 2, wherein said atomized spray is applied in a volatile liquid vehicle having a boiling point within the range of approximately 35° C. to 120° C. and said sheet of glass is electrostatically sprayed while at a minimum temperature equal to said boiling point.

4. The method as in claim 2, wherein said non-reactive fluid is air and said air is applied from a manifold of non-electroconductive material located between said shield and said surface of said substrate.

5. The method as in claim 4, wherein said sheet of glass is curved and said grounded shield extends along an upper curved surface approximately parallel to said curved glass sheet and said manifold is supported along an intermediate curved surface approximately parallel to said curved glass sheet.

6. The method as in claim 4, wherein said air is applied through a plurality of equally spaced apertures of said manifold to form a series of air blasts that blend to form a continuous bed of substantially uniform pressure in the region where said blasts contact said atomized spray.

7. The method as in claim 3, wherein said colored coating composition applied by electrostatic spraying comprises a composition consisting essentially of a colored dye, said liquid vehicle, and a binder containing from about 0.02 percent to about 0.4 percent by weight of plasticized polyvinyl butyral dissolved in a volatile solvent based on the total weight of said colored dye and said volatile solvent.

8. The method according to claim 7, wherein a layer of flexible interlayer material is assembled between said treated glass sheet and another glass sheet with said coated surface facing said layer to form a sandwich, and said sandwich is laminated at superatmospheric pressure and a temperature above the boiling point of said liquid vehicle.

9. The method according to claim 8, wherein said interlayer material is polyvinyl butyral.

10. The method as in claim 7, further including assembling said treated glass sheet with said band facing a layer of flexible interlayer material and laminating said treated glass sheet to said layer of flexible interlayer material.

11. The method as in claim 1, wherein said substrate is supported in an essentially horizontal plane, and said atomized, electroconductive spray is applied in an obliquely downward direction.

12. A method of forming a band of colored material along an outer edge portion of a surface of a flexible nonconductive substrate, said band having a maximum intensity along its outer edge, a decreasing intensity adjacent the inner edge of said band and a curved inner edge for said band comprising supporting a flexible substrate in an orientation in a first plane, supporting a grounded shield of electroconductive material having a curved edge above said substrate with said curved edge of said shield approximately aligned with said inner edge of said portion of said substrate to which said band is to be applied, applying by electrostatic spraying in an oblique direction toward said outer edge portion of a surface of said flexible substrate, from electrostatic spray means spaced from said shield an atomized electroconductive spray of colored coating composition capable of forming said band on said flexible substrate, simultaneously applying a non-reactive fluid between said grounded shield and said substrate toward said outer edge portion of said substrate surface at a rate sufficient to apply a component of force to said atomized spray in a direction parallel to said surface sufficient to control the formation of a smooth boundary portion of graded intensity in a band of colored coating composition that results from the electrostatic spraying of said atomized spray, and discontinuing said simultaneous application of said atomized spray from said electrostatic spray means and said non-reactive fluid when said band develops a desired degree of color intensity.

13. The method as in claim 12, wherein said flexible substrate is a sheet of plasticized polyvinyl butyral.

14. The method as in claim 13, wherein said non-reactive fluid is air and said air is applied from a curved manifold of non-electroconductive material located between said shield and said surface of said flexible substate and at a uniform distance behind the curved edge of said shield.

15. The method as in claim 14, wherein said air is applied through a plurality of equally spaced apertures of said manifold to form a series of air blasts that blend to form a continuous bed of substantially uniform pressure in the region where said blasts contact said atomized spray.

16. The method as in claim 13, wherein said colored coating composition applied by electrostatic spraying comprises a composition consisting essentially of a colored dye and a liquid vehicle and said flexible substrate is at a temperature of 21° C. to 52° C. when said composition is applied.

17. The method according to claim 16, wherein said layer of flexible material is assembled against a glass sheet with said coated surface facing said glass sheet to form a sandwich, and said sandwich is laminated at superatmospheric pressure and a temperature above the boiling point of said liquid vehicle without differentially stretching said flexible material.

18. The method as in claim 12, wherein said flexible substrate is supported by vacuum on a foraminous vacuum platen.

19. The method as in claim 18, wherein said flexible substrate is supported in an oblique plane and said spray is applied in an approximately horizontal direction toward said surface of said substrate.

20. The method as in claim 19, wherein said flexible substrate is supported by vacuum in an oblique plane of support that makes an angle of 30 to 60 degrees with the horizontal.

* * * * *